US007933695B2

(12) United States Patent
Yamaguchi

(10) Patent No.: US 7,933,695 B2
(45) Date of Patent: Apr. 26, 2011

(54) ELECTRIC VEHICLE POWER SOURCE SELECTION

(75) Inventor: Katsuhiko Yamaguchi, Nisshin (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 12/738,897

(22) PCT Filed: Dec. 3, 2008

(86) PCT No.: PCT/JP2008/071948
§ 371 (c)(1),
(2), (4) Date: Apr. 20, 2010

(87) PCT Pub. No.: WO2009/072514
PCT Pub. Date: Jun. 11, 2009

(65) Prior Publication Data
US 2010/0222952 A1 Sep. 2, 2010

(30) Foreign Application Priority Data

Dec. 7, 2007 (JP) ................................. 2007-317164

(51) Int. Cl.
*B60L 9/00* (2006.01)
(52) U.S. Cl. ........ 701/22; 180/65.29; 903/903; 903/907
(58) Field of Classification Search .................... 701/22; 180/65.29; 903/907, 903
See application file for complete search history.

(56) References Cited

U.S. PATENT DOCUMENTS

| 5,549,984 A | * | 8/1996 | Dougherty ...................... 429/61 |
| 5,660,460 A | * | 8/1997 | McLeod, Jr. ................... 362/103 |
| 5,815,824 A | | 9/1998 | Saga et al. |
| 6,741,065 B1 | | 5/2004 | Ishii et al. |
| 2003/0030325 A1 | * | 2/2003 | Shinada et al. .............. 307/10.1 |
| 2004/0164706 A1 | | 8/2004 | Osborne |
| 2008/0111557 A1 | * | 5/2008 | Elder et al. ..................... 324/511 |
| 2009/0107743 A1 | * | 4/2009 | Alston et al. ............... 180/65.21 |
| 2010/0106353 A1 | * | 4/2010 | Watson et al. ................... 701/22 |
| 2010/0121511 A1 | * | 5/2010 | Onnerud et al. ................ 701/22 |

(Continued)

FOREIGN PATENT DOCUMENTS

JP A-8-240435 9/1996

(Continued)

OTHER PUBLICATIONS

International Search Report mailed on Feb. 24, 2009 in corresponding International Application No. PCT/JP2008/071948 (with translation).

(Continued)

*Primary Examiner* — Khoi Tran
*Assistant Examiner* — Brian J Broadhead
(74) *Attorney, Agent, or Firm* — Oliff & Berridge, PLC

(57) ABSTRACT

A vehicle includes a plurality of batteries, a vehicle load (motor generators, inverters, boost converters, connection units, and system main relays configured to be able to select at least one of the plurality of batteries as an electric power supply source, and for generating drive force by receiving electric power from the electric power supply source, and a control unit for controlling the vehicle load such that the vehicle load receives the electric power from the electric power supply source in response to a selection instruction for selecting the electric power supply source. The selection instruction is input by a user. That is, the user can select a battery to be used for traveling of the vehicle.

5 Claims, 8 Drawing Sheets

U.S. PATENT DOCUMENTS

2010/0222952 A1* 9/2010 Yamaguchi .................. 701/22
2010/0291418 A1* 11/2010 Zhou et al. .................. 429/50

FOREIGN PATENT DOCUMENTS

| JP | A-9-298806 | 11/1997 |
| JP | A-2001-45673 | 2/2001 |
| JP | A-2002-8732 | 1/2002 |
| JP | A-2004-524793 | 8/2004 |
| JP | A-2005-237064 | 9/2005 |
| JP | A-2007-116799 | 5/2007 |

OTHER PUBLICATIONS

Japanese Office Action issued in Japanese Patent Application No. 2007-317164 on Feb. 17, 2009 (with translation).

* cited by examiner

FIG.4

| | TRIP | 1 | 2 | 3 | ... |
|---|---|---|---|---|---|
| BATTERY (A) | TRAVELING DISTANCE(km) | 10 | 12 | 0.5 | ... |
| | PRE-TRAVELING CAPACITY(%) | 80 | 80 | 30 | ... |
| | POST-TRAVELING CAPACITY(%) | 40 | 30 | 20 | ... |
| | RATE(km/%) | 0.25 | 0.24 | 0.05 | ... |
| BATTERY (B) | TRAVELING DISTANCE(km) | 10 | 12 | 0 | ... |
| | PRE-TRAVELING CAPACITY(%) | 80 | 80 | 30 | ... |
| | POST-TRAVELING CAPACITY(%) | 40 | 30 | 30 | ... |
| | RATE(km/%) | 0.25 | 0.24 | 0 | ... |

ELECTRIC VEHICLE POWER SOURCE SELECTION

TECHNICAL FIELD

The present invention relates to a vehicle, and in particular, to a vehicle equipped with a plurality of power storage devices that are each chargeable by a power supply external to the vehicle.

BACKGROUND ART

In recent years, vehicles that are equipped with a power storage device storing electric power and use the electric power stored in the power storage device to drive a motor, such as electric vehicles, hybrid vehicles, fuel cell vehicles, and the like have been attracting attention as environmentally-friendly vehicles. In such a vehicle, configuring the power storage device to be externally chargeable has also been under consideration. Further, in the vehicle described above, mounting a plurality of power storage devices to increase a traveling distance has also been under consideration.

With regard to a device or a method for taking electric power from a plurality of power storage devices, various proposals have been made so far. For example, Japanese Patent Laying-Open No. 2005-237064 (Patent Document 1) discloses a controller for a vehicle equipped with a plurality of battery packs. The controller obtains voltage values of high-voltage batteries in the respective battery packs, and determines priority in increasing order of residual capacities indicated by the voltage values. Then, the controller selects a battery pack determined to have the first priority as a battery for traveling.

Patent Document 1: Japanese Patent Laying-Open No. 2005-237064

Patent Document 2: Japanese Patent Laying-Open No. 2001-45673

DISCLOSURE OF THE INVENTION

Problems to be Solved by the Invention

Japanese Patent Laying-Open No. 2005-237064 describes that, since the controller for a vehicle switches a battery to be used for traveling of the vehicle among a plurality of batteries, performance of the high-voltage batteries can be fully utilized without operation by a user. However, some users may think it desirable that they can select a battery to be used for traveling of a vehicle for themselves.

For example, there may be some cases where a vehicle is equipped with a plurality of power storage devices having different properties (for example, power storage capacities) to allow various types of traveling of the vehicle. When a battery to be used for traveling of the vehicle is automatically selected by a controller, actual traveling of the vehicle may be different from traveling of the vehicle desired by the user. In this case, the user may be dissatisfied with not being allowed to select a battery to be used for traveling of the vehicle.

One object of the present invention is to provide a technique for improving convenience for a user in a vehicle equipped with a plurality of power storage devices.

Means for Solving the Problems

In summary, the present invention is a vehicle, including: a plurality of power storage devices each configured to be chargeable and dischargeable by a power supply external to the vehicle, and for storing electric power for generating drive force of the vehicle; a vehicle load configured to be able to select at least one of the plurality of power storage devices as a supply source of the electric power, and for generating the drive force by receiving the electric power from the supply source; an input unit for receiving a selection instruction for selecting the supply source from a user; and a control unit for controlling the vehicle load such that the vehicle load receives the electric power from the supply source in response to the selection instruction input to the input unit.

Preferably, the control unit calculates a residual capacity value of each of the plurality of power storage devices based on at least one of an input/output current and an interterminal voltage of the corresponding power storage device. The vehicle further includes a display unit for displaying the residual capacity value calculated by the control unit to the user.

Preferably, the control unit calculates an allowed traveling distance of the vehicle corresponding to each of the plurality of power storage devices, based on the residual capacity value of each of the plurality of power storage devices at present, and a traveling distance of the vehicle and a reduction amount of the residual capacity value obtained when the vehicle traveled in the past using the corresponding power storage device. The display unit further displays the allowed traveling distance.

Preferably, the vehicle further includes a present location recognition device for recognizing a present location of the vehicle, and a map information output unit for outputting map information. The input unit further receives information of a destination of the vehicle from the user. The control unit calculates a predicted traveling distance from the present location to the destination based on the present location recognized by the present location recognition device, the information of the destination input to the input unit, and the map information from the map information output unit, and determines a candidate for the supply source from among the plurality of power storage devices based on the calculated predicted traveling distance and the allowed traveling distance. The display unit performs display processing for informing the user of the candidate determined by the control unit.

Preferably, the plurality of power storage devices are first and second power storage devices. A power storage capacity of the first power storage device is smaller than a power storage capacity of the second power storage device.

Effects of the Invention

According to the present invention, convenience for a user can be improved in a vehicle equipped with a plurality of power storage devices.

BRIEF DESCRIPTION OF THE DRAWINGS

FIG. 4 is a view showing an exemplary configuration of data in which traveling history of the vehicle is recorded.

DESCRIPTION OF THE REFERENCE SIGNS

Figure 1:
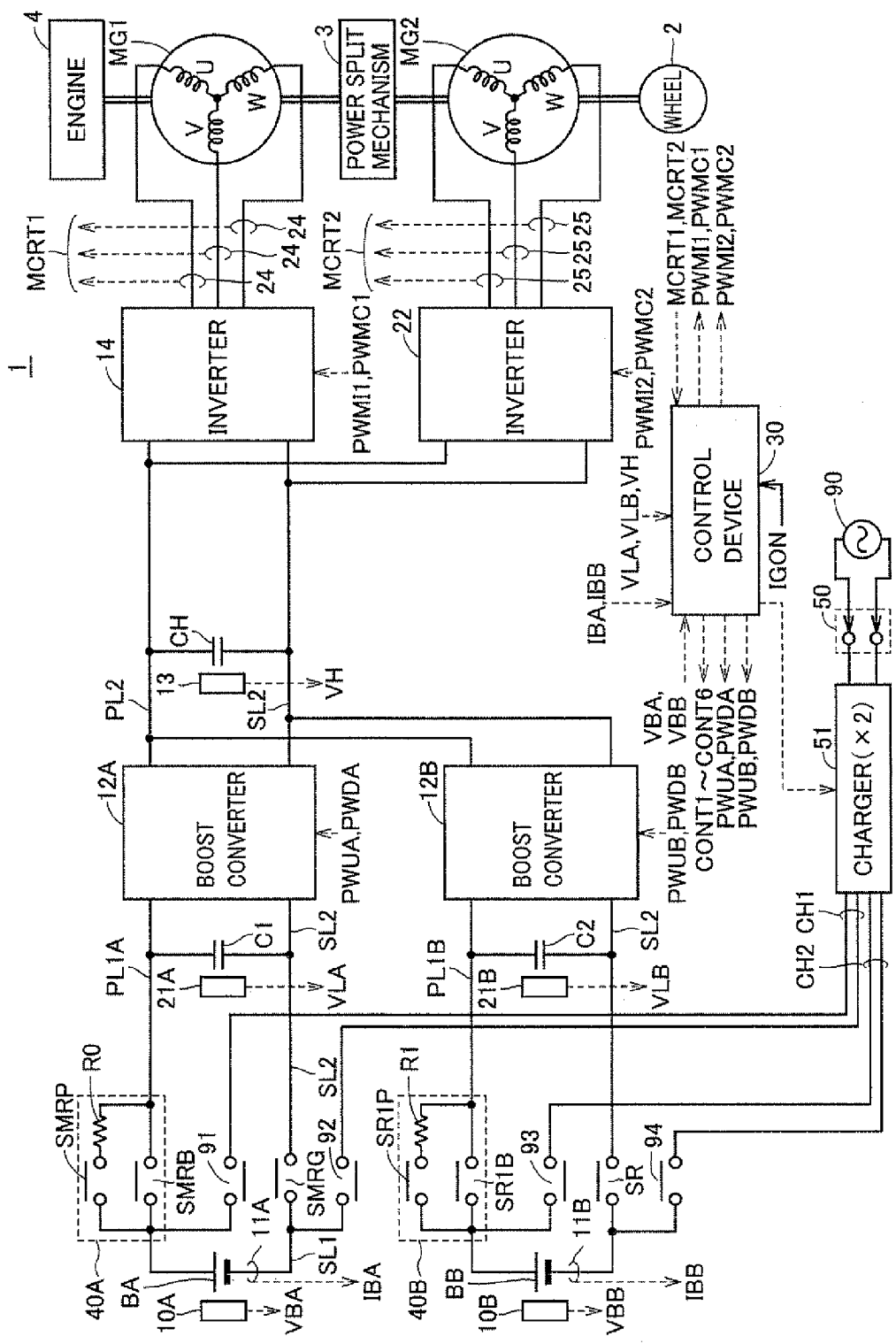
FIG. 1 is a view showing an exemplary configuration of a vehicle in accordance with embodiments of the present invention.

1: vehicle, 2: wheel, 3: power split mechanism, 4: engine, 10A, 10B, 13, 21A, 21B: voltage sensor, 11A, 11B, 24, 25: current sensor, 12A, 12B: boost converter, 14, 22: inverter, 30: control device, 40A, 40B: connection unit, 50: electric power input inlet, 51: charger, 60: navigation system, 61: reading circuit, 62: GPS antenna, 63: gyro sensor, 65: recording medium, 70: touch panel display, 71: display unit, 72: input unit, 81: vehicle image, 82A, 82B: battery image, 83A, 83B: SOC display section, 84A, 84B: allowed traveling distance display section, 85A, 85B: selection key, 86: determination key, 90: commercial power supply, 91-94: charging relay, BA, BB: battery, C1, C2, CH: smoothing capacitor, MG1, MG2: motor generator, N1, N2: neutral point, PL1A, PL1B, PL2: power supply line, R0, R1: limiting resistor, SL1, SL2: ground line, SMRP, SMRB, SMRG, SR1P, SR1B, SR: system main relay.

BEST MODES FOR CARRYING OUT THE INVENTION

Embodiments of the present invention will now be described in detail with reference to the drawings, in which identical or corresponding parts will be designated by the same reference numerals, and the description thereof will not be repeated.

Embodiment 1

FIG. 1 is a view showing an exemplary configuration of a vehicle in accordance with embodiments of the present invention.

Referring to FIG. 1, a vehicle 1 includes batteries BA and BB serving as power storage devices, boost converters 12A and 12B, smoothing capacitors C1, C2, and CH, voltage sensors 10A, 10B, 13, 21A, and 2113, current sensors 11A and 11B, inverters 14 and 22, an engine 4, motor generators MG1 and MG2, a power split mechanism 3, a wheel 2, and a control device 30.

Batteries BA and BB are chargeable and dischargeable power storage devices. Electric power stored in batteries BA and BB is mainly used to generate drive force of vehicle 1. As batteries BA and BB, for example, secondary batteries such as a lead-acid battery, a nickel hydride battery, and a lithium ion battery, or large-capacity capacitors such as an electric double layer capacitor can be used.

Batteries BA and BB may be power storage devices of different types. For example, battery BA may be a large-capacity capacitor and battery BB may be a secondary battery. In addition, for example, batteries BA and BB may be secondary batteries of different types (for example, battery BA is a lithium ion battery and battery BB is a nickel hydride battery).

In the present embodiment, it is assumed that the power storage capacity of battery BA is smaller than the power storage capacity of battery BB. In this regard, however, the power storage capacity of battery BA may be equal to or larger than the power storage capacity of battery BB.

Smoothing capacitor C1 is connected between a power supply line PL1A and a ground line SL2. Voltage sensor 21A detects a voltage VLA across smoothing capacitor C1, and outputs the detected voltage VLA to control device 30. Boost converter 12A boosts the interterminal voltage of smoothing capacitor C1.

Smoothing capacitor C2 is connected between a power supply line PL1B and ground line SL2. Voltage sensor 21B detects a voltage VLB across smoothing capacitor C2, and outputs the detected voltage VLB to control device 30. Boost converter 12B boosts the interterminal voltage of smoothing capacitor C2.

Smoothing capacitor CH smoothes the voltages boosted by boost converters 12A and 128. Voltage sensor 13 detects an interterminal voltage VH of smoothing capacitor CH, and outputs the detected interterminal voltage VH to control device 30.

Inverter 14 converts a direct current (DC) voltage supplied from boost converter 12B or 12A into a three-phase alternating current (AC) voltage, and outputs the three-phase AC voltage to motor generator MG1. Inverter 22 converts a DC voltage supplied from boost converter 12B or 12A into a three-phase AC voltage, and outputs the three-phase AC voltage to motor generator MG2.

Power split mechanism 3 is a mechanism coupled to engine 4 and motor generators MG1, MG2 to split power therebetween. For example, a planetary gear mechanism having three rotation shafts of a sun gear, a planetary carrier, and a ring gear can be used as the power split mechanism. The planetary gear mechanism is configured such that, when rotations of two of the three rotation shafts are determined, rotation of the other one rotation shaft is inevitably determined. These three rotation shafts are connected to rotation shafts of engine 4, motor generator MG1, and motor generator MG2, respectively. The rotation shaft of motor generator MG2 is coupled to wheel 2 by a reduction gear and a differential gear not shown. A decelerator for the rotation shaft of motor generator MG2 may be further mounted or an automatic transmission may be mounted inside power split mechanism 3.

Vehicle 1 further includes a connection unit 40A provided on a positive electrode side of battery BA, and a system main relay SMRG serving as a connection unit provided on a negative electrode side of battery BA. Connection unit 40A includes a system main relay SMRB connected between a positive electrode of battery BA and power supply line PL1A, and a system main relay SMRP and a limiting resistor R0 connected in series with each other and connected in parallel with system main relay SMRB. System main relay SMRG is connected between a negative electrode of battery BA (a ground line SL1) and ground line SL2.

Conductive/nonconductive states of system main relays SMRP, SMRB, and SMRG are controlled by control signals CONT1 to CONT3 supplied from control device 30, respectively.

Voltage sensor 10A measures a voltage VBA across terminals of battery BA. Current sensor 11A detects a current IBA flowing into battery BA. Voltage sensor 10A and current sensor 11A are provided to monitor the state of charge (SOC) of battery BA.

Vehicle 1 further includes a connection unit 40B provided on a positive electrode side of battery BB, and a system main relay SR serving as a connection unit provided on a negative electrode side of battery BB. Connection unit 40B includes a system main relay SR1B connected between a positive electrode of battery BB and power supply line PL1B, and a system main relay SR1P and a limiting resistor R1 connected in series with each other and connected in parallel with system main relay SR1B. System main relay SR is connected between a negative electrode of battery BB and ground line SL2.

Conductive/nonconductive states of system main relays SR1P, SR1B, and SR are controlled by control signals CONT4 to CONT6 supplied from control device 30, respectively.

Ground line SL2 extends through boost converters 12A and 12B to inverters 14 and 22.

Voltage sensor 10B detects a voltage VBB across terminals of battery BB. Current sensor 11B detects a current IBB flowing into battery BB. Voltage sensor 10B and current sensor 11B are provided to monitor the state of charge of battery BB.

Hereinafter, the state of charge (SOC) will also be referred to as a "residual capacity". A value indicating the residual capacity is defined, for example, as 100% when the battery is in a fully charged state and 0% when the battery is in a completely discharged state, and varies in a range from 0% to 100% according to electric power stored in the battery.

Inverter 14 is connected to power supply line PL2 and ground line SL2. Inverter 14 receives the boosted voltage from boost converters 12A and 1213, and drives motor generator MG1 to, for example, start engine 4. Inverter 14 also returns electric power generated in motor generator MG1 by power transmitted from engine 4, to boost converters 12A and 12B, On this occasion, boost converters 12A and 1213 are controlled by control device 30 to operate as step-down circuits.

A current sensor 24 detects a current flowing into motor generator MG1 as a motor current value MCRT1, and outputs motor current value MCRT1 to control device 30.

Inverter 22 is connected to power supply line PL2 and ground line SL2 in parallel with inverter 14. Inverter 22 converts the DC voltage output from boost converters 12A and 12B into a three-phase AC voltage, and outputs the three-phase AC voltage to motor generator MG2 driving wheel 2. Inverter 22 also returns electric power generated in motor generator MG2 by regenerative braking, to boost converters 12A and 12B. On this occasion, boost converters 12A and 1213 are controlled by control device 30 to operate as step-down circuits.

A current sensor 25 detects a current flowing into motor generator MG2 as a motor current value MCRT2, and outputs motor current value MCRT2 to control device 30.

Control device 30 receives torque command values and rotation speeds of motor generators MG1 and MG2, values of voltages VBA, VBB, VLA, VLB, and VH, motor current values MCRT1 and MCRT2, and an activation signal IGON. Then, control device 30 outputs to boost converter 12B a control signal PWUB giving an instruction to boost a voltage, a control signal PWDB giving an instruction to step down a voltage, and a shut-down signal giving an instruction to inhibit operation.

Further, control device 30 outputs to inverter 14 a control signal PWMI1 for giving a drive instruction to convert the DC voltage output from boost converters 12A and 12B into an AC voltage for driving motor generator MG1, and a control signal PWMC1 for giving a regenerative instruction to convert an AC voltage generated in motor generator MG1 into a DC voltage and return the DC voltage to boost converters 12A and 12B.

Similarly, control device 30 outputs to inverter 22 a control signal PWMI2 for giving a drive instruction to convert the DC voltage into an AC voltage for driving motor generator MG2, and a control signal PWMC2 for giving a regenerative instruction to convert an AC voltage generated in motor generator MG2 into a DC voltage and return the DC voltage to boost converters 12A and 12B.

It is to be noted that motor generators MG1 and MG2, inverters 14 and 22, boost converters 12A and 12B, connection units 40A and 40B, and system main relays SMRG and SR constitute a vehicle load generating the drive force of vehicle 1 by the electric power stored in batteries BA and BB.

The vehicle is configured such that the power storage devices (i.e., batteries BA and BB) are chargeable by a power supply external to the vehicle. Therefore, vehicle 1 further includes an electric power input inlet 50, a charger 51, and an electric power input channel to which outputs CH1 and CH2 of charger 51 are connected.

Electric power input inlet 50 is a terminal for connecting to vehicle 1 a commercial power supply 90 (for example, AC 100 V) external to the vehicle. In vehicle 1, one or both of batteries BA and BB can be charged from commercial power supply 90 external to the vehicle that is connected to electric power input inlet 50.

Charger 51 can receive electric power supplied from a source external to the vehicle, and simultaneously supply first charging electric power and second charging electric power to batteries BA and BB, respectively. Charger 51 includes the first output CH1 outputting the first charging electric power to battery BA, and the second output CH2 outputting the second charging electric power to battery BB.

The first output CH1 is connected to battery BA via charging relays 91 and 92, not through system main relays SMRB and SMRG between battery BA and the first boost converter 12A.

The second output CH2 is connected to battery BB via charging relays 93 and 94, not through system main relays SR1B and SR between battery BB and the second boost converter 12B.

Preferably, charger 51 is configured to be able to determine magnitudes of the first charging electric power and the second charging electric power based on the states of batteries BA and BB, and separately distribute to batteries BA and BB the electric power supplied from the source external to the vehicle. More preferably, charger 51 is configured to be able to change a distribution ratio in accordance with the SOCs of batteries BA and BB when separately distributing to batteries BA and BB the electric power supplied from the source external to the vehicle. Thereby, the SOCs of batteries BA and BB can be matched.

Figure 2:
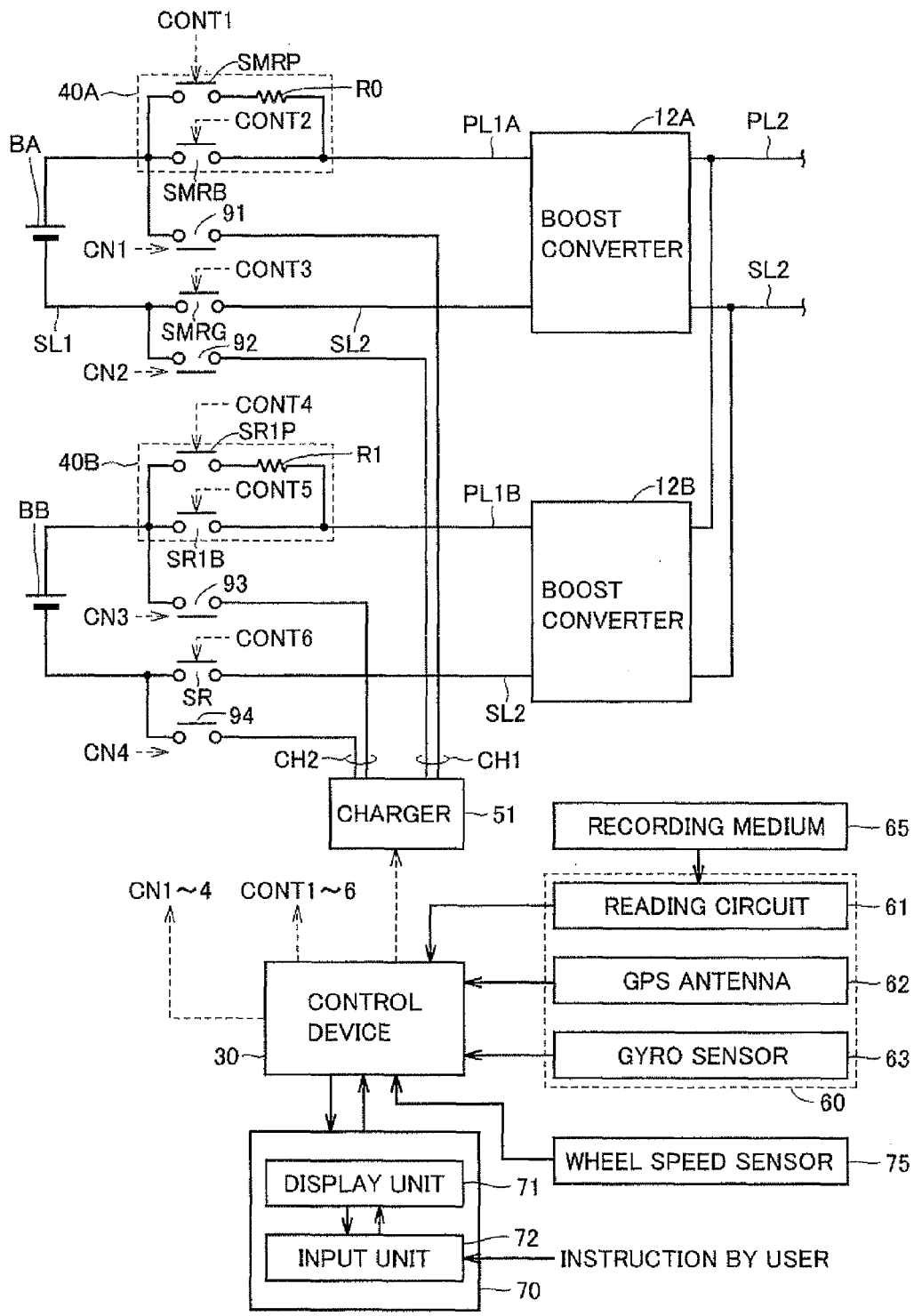
FIG. 2 is a block diagram for describing a configuration peripheral to a control device 30 in more detail.

FIG. 2 is a block diagram for describing a configuration peripheral to control device 30 in more detail.

Referring to FIGS. 2 and 1, control device 30 transmits control signals CONT1 to CONT6 to system main relays SMRP, SMRB, SMRG, SR1P, SR1B, and SR, respectively. Thereby, the system main relays are turned on and off. Similarly, control device 30 transmits control signals CN1 to CN4 to charging relays 91, 92, 93, 94, respectively. Thereby, the charging relays are turned on and off.

In the present embodiment, it is possible to take electric power from only one of battery BA and battery BB, and it is also possible to take electric power from both of battery BA and battery BB. Control device 30 turns on a system main relay for connecting a battery to be discharged and a boost converter corresponding to the battery. The boost converter connected to the battery to be discharged via the system main relay boosts a DC voltage from the battery.

Specifically, the vehicle load including the system main relays is configured to be able to select at least one of batteries BA and BB as an electric power supply source. The vehicle load generates the drive force of the vehicle by receiving electric power from the supply source.

Further, in the present embodiment, it is possible to charge only one of battery BA and battery BB, and it is also possible to charge both of battery BA and battery BB. Control device 30 turns on a charging relay corresponding to a battery to be charged. Charger 51 connected to the battery to be charged via the charging relay supplies electric power from a power supply external to the vehicle, to the battery.

A navigation system 60 and a touch panel display 70 are connected to control device 30. Navigation system 60 includes a reading circuit 61 for reading information recorded in a recording medium 65, a GPS (Global Positioning System) antenna 62, and a gyro sensor 63.

Recording medium 65 is a medium recording various types of information including map information, and examples thereof include a CD (Compact Disc), a DVD (Digital Versatile Disc), a memory card, and the like.

Control device 30 obtains information of a destination set by a user from touch panel display 70. Control device 30 recognizes a present location of the vehicle using GPS antenna 62 and gyro sensor 63. Then, control device 30 displays the present location on touch panel display 70, with the present location being superimposed on the map information read from recording medium 65 by reading circuit 61.

Specifically, GPS antenna 62 and gyro sensor 63 constitute a present location recognition device for recognizing the present location of the vehicle. Further, recording medium 65 and reading circuit 61 constitute a map information output unit for outputting the map information. Instead of recording medium 65 and reading circuit 61, a device (for example, a hard disk drive) storing the map information in a non-volatile manner and reading and outputting the stored content may be used.

Further, control device 30 searches for a traveling route from the present location to the destination, and causes touch panel display 70 to display the traveling route.

A wheel speed sensor 75 detects a rotation speed of wheel 2. Control device 30 calculates a traveling distance of vehicle 1 based on the rotation speed of the wheel detected by wheel speed sensor 75.

Touch panel display 70 includes a display unit 71 and an input unit 72. Input unit 72 receives an instruction from the user. Display unit 71 displays various types of information including a result of processing by control device 30, the map information, information guiding the user to input an instruction, the content of the instruction input to input unit 72 by the user, and other types of information.

In the present embodiment, the user can select a battery to be used for traveling of vehicle 1 (i.e. a supply source supplying electric power to the vehicle load) from among batteries BA and BB. The user can select only one of batteries BA and BB, and can also select both of batteries BA and BB, as an electric power supply source.

Display unit 71 displays information for allowing the user to select an electric power supply source. Specifically, display unit 71 displays a residual capacity value of each battery, an allowed traveling distance in a case where each battery is used as a supply source, and the like.

Input unit 72 receives an instruction by the user for selection of an electric power supply source (a selection instruction).

Since the configurations of other parts shown in FIG. 2 are identical to the configurations of the corresponding parts in FIG. 1, the description thereof will not be repeated.

Next, information displayed on touch panel display 70 (display unit 71) when the user selects an electric power supply source will be specifically described.

Figure 3:
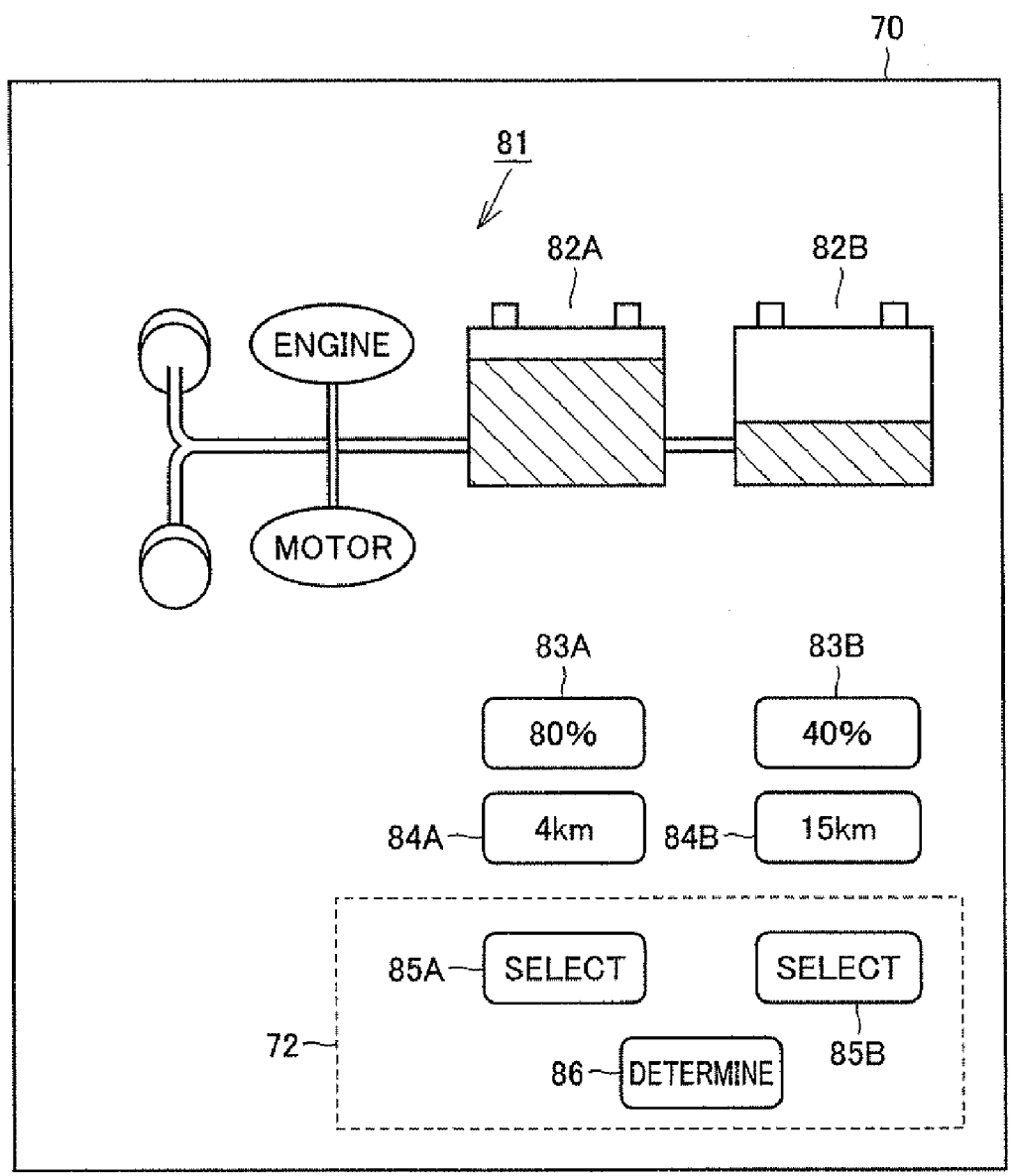
FIG. 3 is a view for describing information displayed on a touch panel display 70.

Referring to FIG. 3, a vehicle image 81 representing vehicle 1 is displayed on touch panel display 70. Vehicle image 81 includes battery images 82A and 82B corresponding to batteries BA and BB shown in FIG. 1, respectively.

SOC display sections 83A and 83B for displaying residual capacity values of batteries BA and BB, respectively, are further provided on a screen of touch panel display 70. It is to be noted that battery images 82A and 82B also display residual capacities of the respective corresponding batteries.

An allowed traveling distance display section 84A for displaying an allowed traveling distance of vehicle 1 achieved by battery BA and an allowed traveling distance display section 84B for displaying an allowed traveling distance of vehicle 1 achieved by battery BB are further provided on the screen of touch panel display 70.

Further, a selection key 85A for allowing the user to select battery BA as a battery to be charged (or to be discharged), a selection key 85B for allowing the user to select battery BB as a battery to be charged (or to be discharged), and a determination key 86 for allowing the user to finally determine the battery to be charged (or to be discharged) are displayed on the screen of touch panel display 70. Selection keys 85A and 85B and determination key 86 constitute input unit 72 of FIG. 2.

When the user presses a selection key once, selection of a battery corresponding to the selection key becomes valid, and when the user presses the selection key once more, the selection of the battery is cancelled. When the user presses determination key 86, the battery selected at the time is determined as a supply source.

Next, the allowed traveling distance of the vehicle calculated by control device 30 will be described in detail. Control device 30 calculates the allowed traveling distance of the vehicle achieved by each battery, based on data indicating traveling history of the vehicle stored therein.

FIG. 4 is a view showing an exemplary configuration of data in which traveling history of the vehicle is recorded. It is noted for confirmation that values described below are merely examples for making the description easy to understand, and not intended to limit the present invention.

Referring to FIG. 4, for each trip, a traveling distance of the vehicle, a residual capacity value of a battery at the time of starting the trip (i.e., pre-traveling capacity), a residual capacity value of the battery at the time of terminating the trip (i.e., post-traveling capacity), and a traveling distance per unit reduction amount of the residual capacity value in the trip (i.e., rate) are recorded. Herein, the "trip" refers to traveling of vehicle 1 from when control device 30 receives activation signal IGON to when control device 30 receives a stop signal. Further, the data has the traveling distance, the pre-traveling capacity, the post-traveling capacity, and the rate corresponding to each battery.

In FIG. 4, batteries BA and BB are indicated as "battery (A)" and "battery (B)", respectively. Further, in the description below, batteries BA and BB will also be referred to as "battery (A)" and "battery (B)", respectively.

In a first trip and a second trip, the traveling distance of battery (A) is identical to the traveling distance of battery (B). This indicates that vehicle 1 traveled using both of batteries (A) and (B).

In both of battery (A) and battery (B), the pre-traveling capacity in the second trip is greater than the post-traveling capacity in the first trip. This indicates that battery (A) and battery (B) were charged after termination of the first trip.

Control device 30 calculates the pre-traveling capacity and the post-traveling capacity based on detection results of the voltage sensor and the current sensor provided for each battery (see FIG. 1). The pre-traveling capacity is calculated at the time of starting a trip, and the post-traveling capacity is calculated at the time of terminating the trip. Then, control device 30 calculates the rate based on the pre-traveling capacity and the post-traveling capacity, and the traveling distance of the vehicle in the trip. An equation for calculating the rate is represented as [traveling distance/{(pre-traveling capacity)−(post-traveling capacity)}].

Referring to a third trip, however, the pre-traveling capacity and the post-traveling capacity of battery (B) are identical. This indicates that the vehicle traveled using only battery (A). In this case, the rate of battery (B) is 0.

Figure 5:
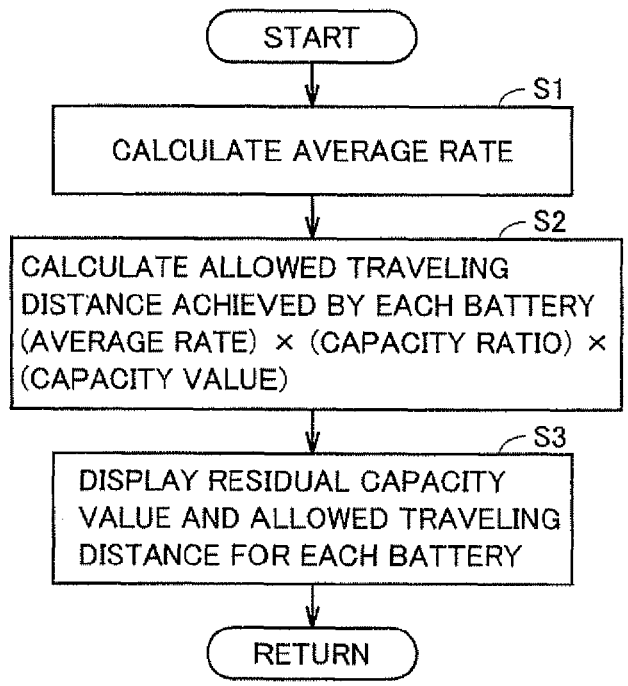
FIG. 5 is a flowchart describing processing by control device 30 in a case where both of batteries BA and BB are selected by a user.

FIG. 5 is a flowchart describing processing of calculating the allowed traveling distance of the vehicle in a case where both of batteries BA and BB are selected by the user. The processing shown in this flowchart is invoked from a main routine and performed for example when a prescribed condition is satisfied (for example, when the user provides control device 30, through touch panel display 70, with an instruction to display the screen shown in FIG. 3).

Referring to FIG. 5, when the processing is started, control device 30 calculates in step S1 an average value of the rates included in the data shown in FIG. 4 (i.e., an average rate). Since the vehicle traveled using only battery (A) in the third trip in the case of the data shown in FIG. 4, control device 30 excludes the rate in the third trip when calculating the average rate. Therefore, the average rate derived from the data shown in FIG. 4 is an average value (0.245 km/%) of the rate in the first trip (0.25 km/%) and the rate in the second trip (0.24 km/%).

In step S2, control device 30 calculates the allowed traveling distance achieved by each battery. Specifically, control device 30 calculates the allowed traveling distance by obtaining the product of the average rate calculated in step S1, a capacity ratio between batteries BA and BB, and the residual capacity value of the battery.

For example, it is assumed that the capacity ratio between batteries BA and BB is 20:80, and both batteries BA and BB have a value of 80% as the pre-traveling capacities. In this case, the allowed traveling distance achieved by battery BA is 0.245×0.2×80=3.9 (km), and the allowed traveling distance achieved by battery BB is 0.245×0.8×80=11.8 (km).

In step S3, control device 30 causes touch panel display 70 (display unit 71) to display the calculated residual capacity value and allowed traveling distance for each battery. When processing in step S3 is terminated, overall processing returns to the main routine.

Figure 6:
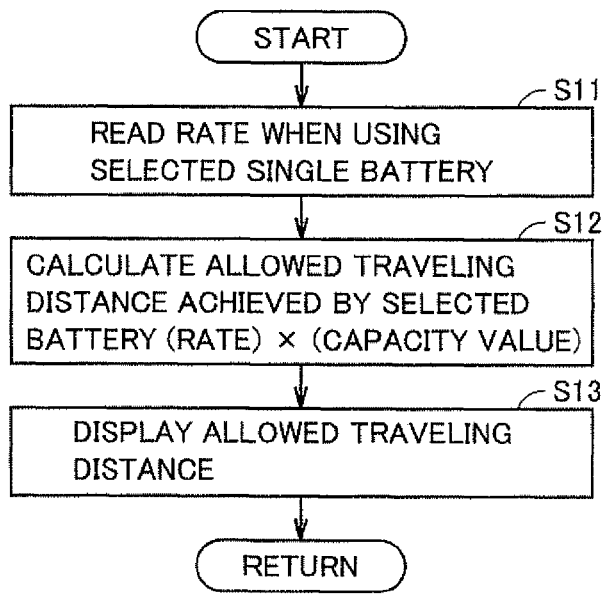
FIG. 6 is a flowchart describing processing by control device 30 in a case where only battery BA or battery BB is selected for use by the user.

FIG. 6 is a flowchart describing processing by control device 30 in a case where only battery BA or battery BB is selected for use by the user. The processing shown in this flowchart is invoked from the main routine and performed when a prescribed condition is satisfied (for example, when the user provides control device 30 with an instruction to display the screen shown in FIG. 3).

Referring to FIG. 6, in step S11, control device 30 reads from therein a rate when using a single battery selected by the user from among batteries BA and BB. As described above, control device 30 stores therein the data shown in FIG. 4. Control device 30 reads a rate when using a single battery that is included in the data.

In step S12, control device 30 calculates the allowed traveling distance achieved only by the battery selected by the user. Specifically, control device 30 calculates the allowed traveling distance by obtaining the product of the rate and the residual capacity value corresponding to the battery.

For example, it is assumed that battery (A) is selected by the user and the pre-traveling capacity of battery (A) is 80%. Since the data shown in FIG. 4 indicates that the rate when using only battery (A) is 0.05, the allowed traveling distance when using only battery (A) is 0.05×80=4 (km).

Control device 30 also calculates the allowed traveling distance achieved by battery (B). An equation for calculating the allowed traveling distance in this case is identical to the equation used for processing in step S2. Therefore, the allowed traveling distance achieved by battery (B) is 11.8 (km).

In step S13, control device 30 causes touch panel display 70 (display unit 71) to display the calculated allowed traveling distance. When processing in step S13 is terminated, overall processing returns to the main routine.

As described above, according to Embodiment 1, a vehicle is equipped with two power storage devices (batteries BA and BB). A user inputs a selection instruction for selecting one or both of batteries BA and BB to touch panel display 70 (input unit 72). In response to the selection instruction, control device 30 controls a vehicle load such that the vehicle load receives electric power from a battery (batteries) selected by the user. This allows meticulous selection of the batteries for use, and can improve convenience for the user.

Further, since the residual capacity value of each battery and the allowed traveling distance achieved by each battery are displayed on the display unit in the present embodiment, the user can determine a battery to be used (i.e., to be charged or discharged) based on these pieces of information. This can improve convenience for the user.

Furthermore, the capacity of battery BA is smaller than the capacity of battery BB in the present embodiment. In a case where the user drives a vehicle for only a short distance, there is a high possibility that the user can use the vehicle sufficiently when the user charges and discharges only a battery with a smaller capacity (i.e., battery BA). Therefore, in a case where only battery BA is charged, charging time can be reduced. Further, even in a case where battery BA is deteriorated and should be replaced, there is a high possibility that it costs less to replace a battery with a smaller capacity. This can improve convenience for the user.

Embodiment 2

A configuration of a vehicle in accordance with Embodiment 2 is identical to the configuration of vehicle 1 shown in FIGS. 1, 2, and the like, and the description thereof will not be repeated below. Hereinafter, the vehicle in accordance with Embodiment 2 will be described with reference to FIG. 1 or 2 as appropriate.

Figure 7:
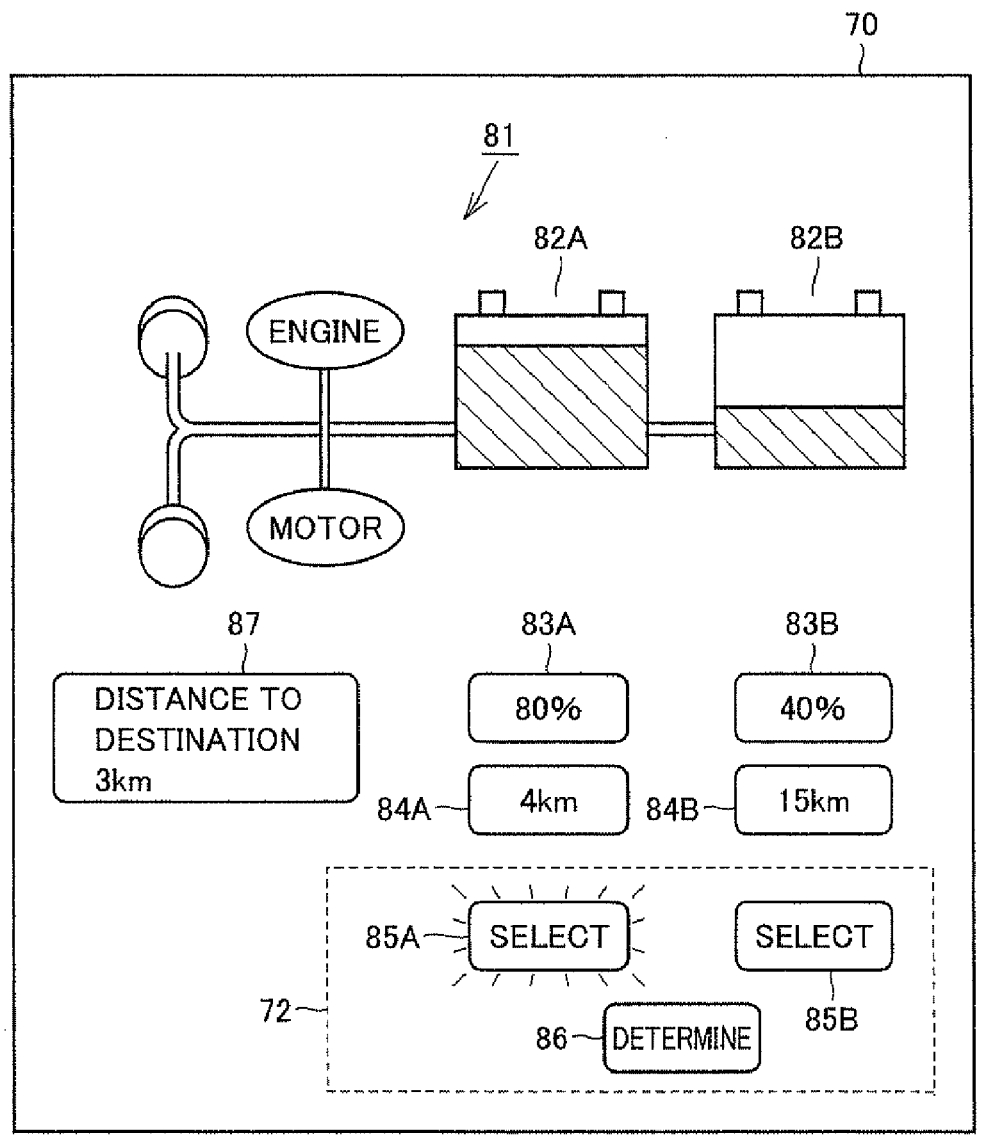
FIG. 7 is a view for describing display contents on a touch panel display mounted in a vehicle in accordance with Embodiment 2.

FIG. 7 is a view for describing display contents on a touch panel display mounted in the vehicle in accordance with Embodiment 2.

Referring to FIGS. 7 and 3, in the display contents shown in FIG. 7, information of a distance from a present location to a destination is added to the display contents shown in FIG. 3. Further, in FIG. 7, to indicate a battery recommended for use when the vehicle travels the distance, the selection key corresponding to the battery recommended for use (i.e., selection key 85A in FIG. 7) is shown in a blinking manner. Although being different from the display contents shown in FIG. 3 on these points, the display contents shown in FIG. 7 are identical to the display contents shown in FIG. 3 on other points, and thus the description thereof will not be repeated.

Control device 30 (see FIGS. 1 and 2) determines a battery recommended for use (i.e., a candidate for a supply source) from among batteries BA and BB, based on the distance from the present location to the destination (i.e., a predicted traveling distance) and the allowed traveling distance of each battery. Further, control device 30 causes touch panel display 70 (display unit 71) to perform display processing for informing the user of the determined battery recommended for use.

In the present embodiment, to inform the user of the battery recommended for use determined by control device 30, touch panel display 70 displays a corresponding selection key in a blinking manner. However, the display processing for informing the user of the battery recommended for use may be performed in a different manner. For example, the selection key corresponding to the battery recommended for use may be displayed in a color different from the color for displaying the other selection key.

Figure 8:
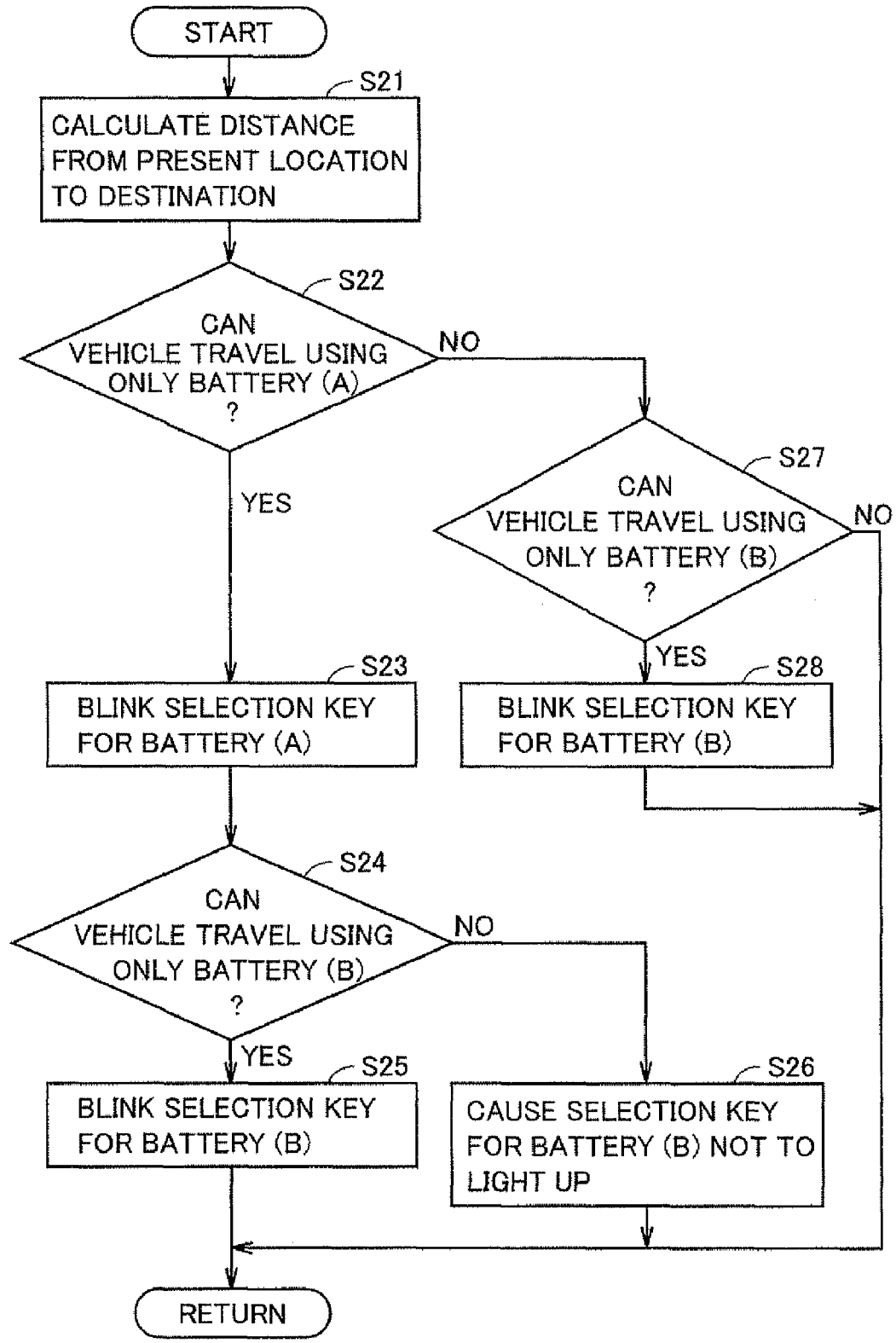
FIG. 8 is a flowchart describing processing for displaying a battery recommended for use in accordance with Embodiment 2.

FIG. 8 is a flowchart describing processing for displaying a battery recommended for use in accordance with Embodiment 2. The processing shown in this flowchart is invoked from the main routine and performed for example when a prescribed condition is satisfied (for example, when the user provides control device 30 with an instruction to display the screen shown in FIG. 7).

Referring to FIGS. 8 and 2, when the processing is started, firstly in step S21, control device 30 obtains information of a present location of vehicle 1 based on information from GPS antenna 62 and gyro sensor 63. Control device 30 also obtains information of a destination of vehicle 1 through input unit 72. Further, control device 30 obtains the map information read from recording medium 65 by reading circuit 61. Based on these pieces of information, control device 30 calculates a distance from the present location to the destination of the vehicle (i.e., a predicted traveling distance).

In step S22, control device 30 determines whether or not the vehicle can travel from the present location to the destination using only battery BA (battery (A)). As in Embodiment 1, control device 30 calculates the allowed traveling distance of the vehicle in a case where the vehicle travels using only battery BA, based on the data shown in FIG. 4 (see the flowchart of FIG. 6). If the calculated allowed traveling distance is greater than the predicted traveling distance obtained in step S21, control device 30 determines that the vehicle can travel using only battery BA (battery (A)). In this case (YES in step S22), control device 30 controls touch panel display 70 to blink the selection key for battery (A) (i.e., selection key 85A) (step S23).

In step S24 subsequent to step S23, control device 30 calculates the allowed traveling distance of the vehicle in a case where the vehicle travels using only battery BB, based on the data shown in FIG. 4. Then, control device 30 determines whether or not the vehicle can travel using only battery BB (battery (B)).

If the calculated allowed traveling distance is greater than the predicted traveling distance obtained in step S21, control device 30 determines that the vehicle can travel using only battery BB (battery (B)). In this case (YES in step S24), control device 30 controls touch panel display 70 to blink the selection key for battery (B) (i.e., selection key 85B) (step S25). In this case, both of selection keys 85A and 85B blink.

That is, in a case where the vehicle can travel using only battery BA and also can travel using only battery BB, both of selection keys 85A and 85B blink. In some cases, the user desires to avoid battery BA from reaching the end of its life earlier due to continued use of battery BA only. Therefore, even if the vehicle can travel using only battery BA, when the vehicle can also travel using only battery BB, control device 30 causes both of selection keys 85A and 85B to blink. This can increase the possibility of the user selecting battery BB or selecting both of batteries BA and BB. Consequently, this can avoid battery BA from reaching the end of its life earlier.

If the allowed traveling distance calculated in step S24 is smaller than the predicted traveling distance obtained in step S21, control device 30 determines that the vehicle cannot travel using only battery BB (battery (B)). In this case (NO in step S24), control device 30 causes the selection key for battery (B) (i.e., selection key 85B) not to light up (step S26). Therefore, only selection key 85A blinks.

On the other hand, if the allowed traveling distance calculated by control device 30 in step S22 is smaller than the predicted traveling distance (NO in step S22), control device 30 calculates the allowed traveling distance of the vehicle in the case where the vehicle travels using only battery BB, based on the data shown in FIG. 4, as in processing in step S24. Then, control device 30 determines whether or not the vehicle can travel using only battery BB (battery (B)) (step S27).

If the calculated allowed traveling distance is greater than the predicted traveling distance obtained in step S21, control device 30 determines that the vehicle can travel using only battery BB (battery (B)). In this case (YES in step S27), control device 30 controls touch panel display 70 to blink the selection key for battery (B) (i.e., selection key 85B) (step S28). In this case, only selection key 85B blinks.

On the other hand, if the allowed traveling distance calculated in step S27 is smaller than the predicted traveling distance obtained in step S21 (NO in step S27), control device 30 determines that vehicle 1 requires both of batteries BA and BB to travel. Therefore, control device 30 terminates the processing, with both of selection keys 85A and 85B not being lit up. In this case, overall processing returns to the main routine. Overall processing also returns to the main routine when processing in each of steps S25, S26, and S28 is terminated.

As described above, according to Embodiment 2, when a user selects any of a plurality of batteries, the user can be guided to easily carry out selection. This can improve convenience for the user.

The number of power storage devices mounted in a vehicle to which the present invention is applicable is not limited to two, and the number of the power storage devices may be more than two, as long as they are provided in a plural number. As in the configuration shown in FIG. 1, the number of boost converters and the number of system main relays are determined according to the number of the power storage devices. Control device 30 can select a supply source (power storage device) supplying electric power to a vehicle load, from among the plurality of power storage devices, by controlling the system main relays, the boost converters, and the like in response to a selection instruction by the user. Similarly, the number of charging relays is determined according to the number of the power storage devices. Thereby, control device 30 can select a power storage device to be charged, from among the plurality of power storage devices, by controlling the charging relays in response to a selection instruction by the user. Therefore, the number of power storage devices is not particularly limited as long as they are provided in a plural number.

Further, the configuration for charging batteries BA and BB using an external power supply is not limited to the configuration shown in FIG. 1. For example, charger 51 may be provided external to vehicle 1. Alternatively, as in an exemplary configuration shown for example in FIG. 9, vehicle 1 may be provided with a first electric power input line ACL1 connecting one terminal of inlet 50 with a neutral point N1 of a three-phase coil of motor generator MG1, and an electric power input line ACL2 connecting the other terminal of inlet 50 with a neutral point N2 of a three-phase coil of motor generator MG2. In this configuration, vehicle 1 is not provided with charging relays 91 to 94 and charger 51. The configuration shown in FIG. 9 is different from the configuration shown in FIG. 1 on this point.

Figure 9:
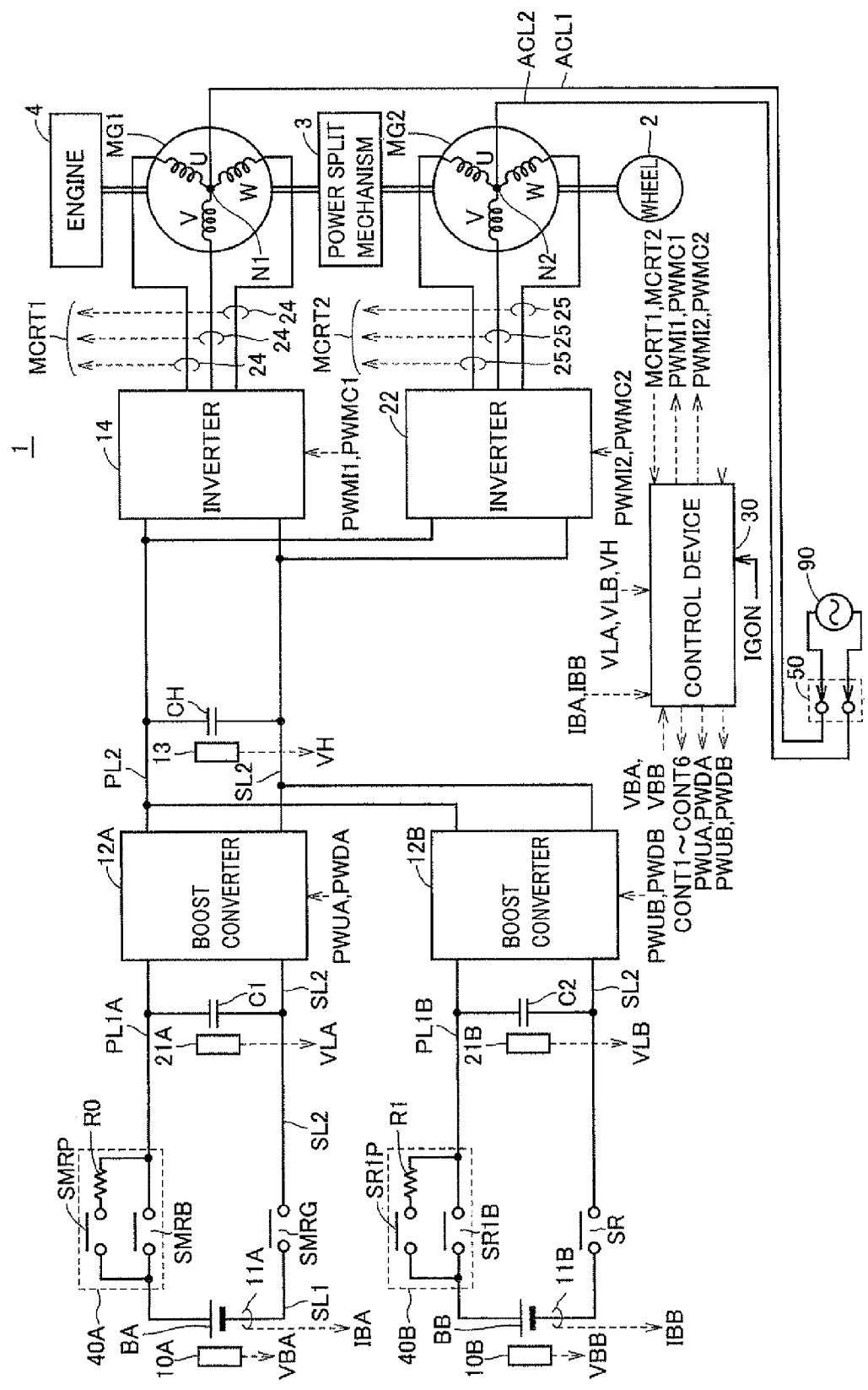
FIG. 9 is a view showing another exemplary configuration for charging the vehicle in accordance with the embodiments of the present invention.

In the configuration shown in FIG. 9, inverters 14 and 22 convert AC voltages applied to neutral points N1 and N2 into DC voltages in response to instruction signals from control device 30. Further, boost converters 12A and 12B convert the DC voltages from inverters 14 and 22 into voltages suitable for charging batteries BA and BB in response to instruction signals from control device 30. The voltages from boost converters 12A and 12B are applied to one or both of batteries BA and BB by control device 30 controlling connection units 40A and 40B and system main relays SMRG and SR.

Further, a hybrid vehicle described in the present embodiment is a series/parallel type hybrid vehicle in which power of an engine can be split by a power split mechanism and separately transmitted to wheel 2 and to motor generator MG1. However, since the present invention is applicable to a vehicle having a power storage device chargeable by an external power supply, the present invention is also applicable to a hybrid vehicle of a type other than the series/parallel type. For example, the present invention is also applicable to a so-called series type hybrid vehicle in which engine 4 is used only for driving motor generator MG1, and drive force of the vehicle is generated only by motor generator MG2, a hybrid vehicle in which only regenerative energy among kinetic energy generated by engine 4 is collected as electric energy, a motor-assist type hybrid vehicle mainly powered by an engine and assisted by a motor as necessary, and the like.

Further, the present invention is applicable to a vehicle which is equipped with an electric motor generating traveling drive force and a plurality of power storage devices storing electric power to be supplied to the electric motor, and in which the plurality of power storage devices are configured to be chargeable by an external power supply. In the present embodiment, a hybrid vehicle equipped with an internal combustion engine and motor generators has been described as an example of such a vehicle. However, the vehicle is not limited to a hybrid vehicle, and the present invention is also applicable for example to an electric vehicle.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

The invention claimed is:

1. A vehicle, comprising:
a plurality of power storage devices each configured to be chargeable and dischargeable by a power supply external to said vehicle, and for storing electric power for generating drive force of said vehicle;
a vehicle load configured to be able to select at least one of said plurality of power storage devices as a supply source of said electric power, and for generating said drive force by receiving said electric power from said supply source;
an input unit for receiving a selection instruction for selecting said supply source from a user; and
a control unit for controlling said vehicle load such that said vehicle load receives said electric power from said supply source in response to said selection instruction input to said input unit.

2. The vehicle according to claim 1, wherein
said control unit calculates a residual capacity value of each of said plurality of power storage devices based on at least one of an input/output current and an interterminal voltage of the corresponding power storage device, and
said vehicle further comprises a display unit for displaying said residual capacity value calculated by said control unit to said user.

3. The vehicle according to claim 2, wherein
said control unit calculates an allowed traveling distance of said vehicle corresponding to each of said plurality of power storage devices, based on said residual capacity value of each of said plurality of power storage devices at present, and a traveling distance of said vehicle and a reduction amount of said residual capacity value obtained when said vehicle traveled in the past using the corresponding power storage device, and
said display unit further displays said allowed traveling distance.

4. The vehicle according to claim 3, further comprising:
a present location recognition device for recognizing a present location of said vehicle; and
a map information output unit for outputting map information, wherein
said input unit further receives information of a destination of said vehicle from said user,
said control unit calculates a predicted traveling distance from said present location to said destination based on said present location recognized by said present location recognition device, the information of said destination input to said input unit, and said map information from said map information output unit, and determines a candidate for said supply source from among said plurality of power storage devices based on calculated said predicted traveling distance and said allowed traveling distance, and
said display unit performs display processing for informing said user of said candidate determined by said control unit.

5. The vehicle according to claim 1, wherein
said plurality of power storage devices are first and second power storage devices, and
a power storage capacity of said first power storage device is smaller than a power storage capacity of said second power storage device.

* * * * *